June 25, 1940.  C. S. McCARTHY  2,205,987
MECHANISM CONTROL
Filed April 3, 1939  2 Sheets-Sheet 1
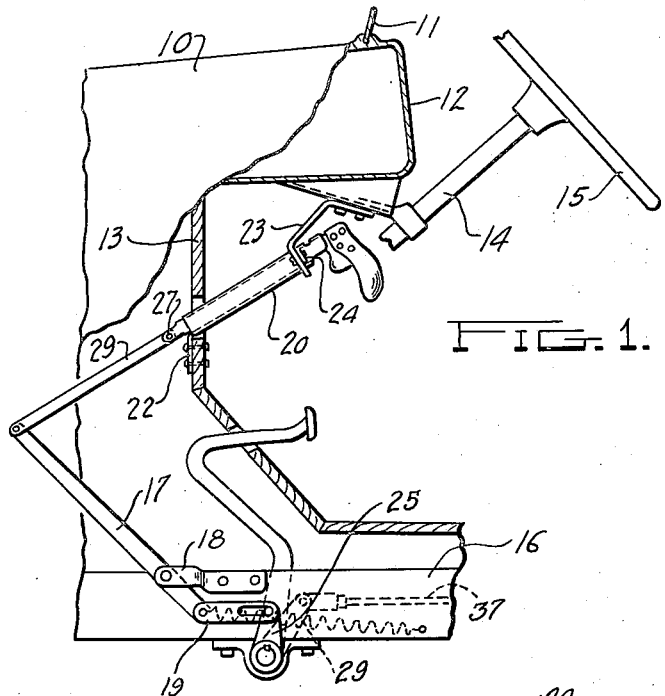
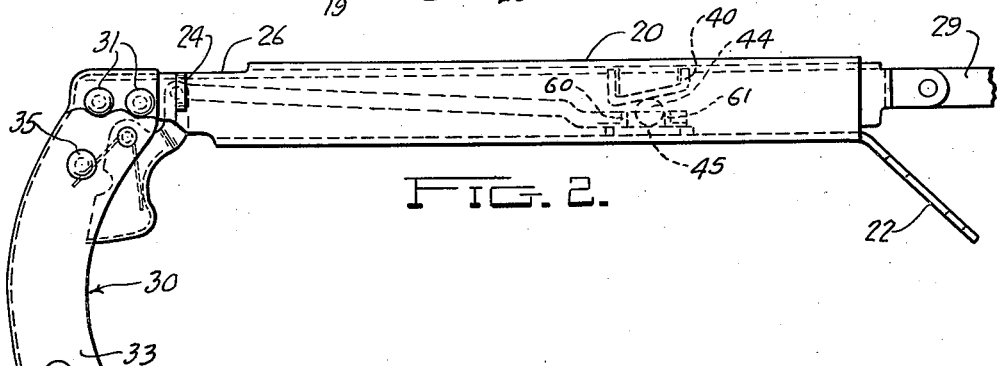
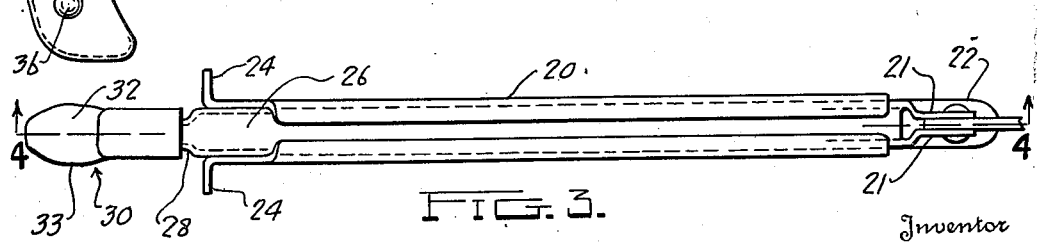
Inventor
Charles S. McCarthy
By Braselton, Whitcomb Davies
Attorney June 25, 1940. C. S. McCARTHY 2,205,987
MECHANISM CONTROL
Filed April 3, 1939 2 Sheets-Sheet 2
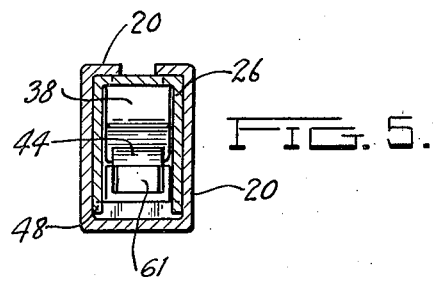
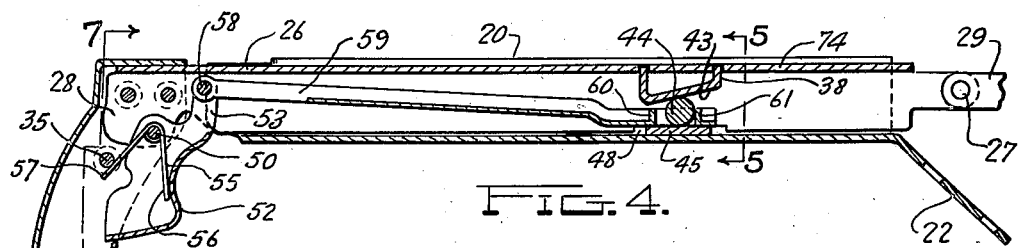
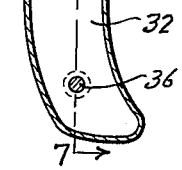
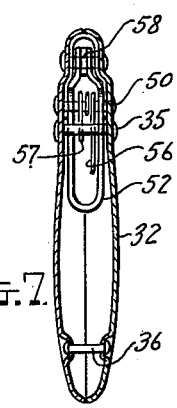
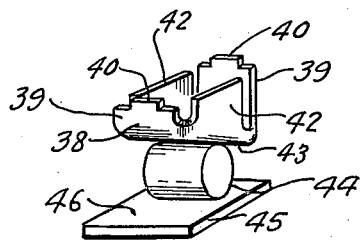
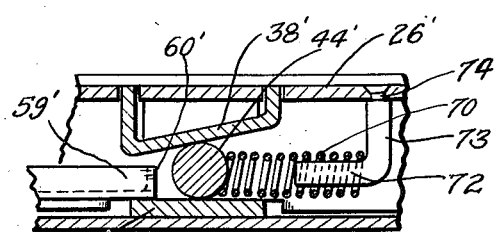
Inventor
Charles S. McCarthy
By Bruselton, Whitcomb Davies
Attorney Patented June 25, 1940

2,205,987

UNITED STATES PATENT OFFICE 2,205,987

MECHANISM CONTROL

Charles S. McCarthy, Toledo, Ohio, assignor to The Logan Gear Company, Toledo, Ohio, a corporation of Ohio Application April 3, 1939, Serial No. 265,713

9 Claims. (Cl. 74—503)

This invention pertains to mechanism control and more especially to an arrangement for controlling the braking mechanism of an automotive vehicle.

The invention pertains to an arrangement of brake control mechanism having a manipulating member arranged for movement in a straight line for actuating and releasing the braking mechanism embodying simple yet effective means for retaining the manipulating member in any position.

The invention also has for an object the provision of a brake manipulating or controlling means particularly adapted to be mounted adjacent the instrument panel of an automotive vehicle within convenient operating position of the vehicle operator.

Another object of the invention resides in the provision of a brake control mechanism wherein the major number of elements are fabricated of sheet metal whereby the interchangeability of parts is enhanced and in which the parts are capable of easy assembly.

Still another object of the invention resides in a brake control mechanism wherein a moving element of the control is mounted in an elongated guide giving exceptional bearing surface and facilitating easy operation of the element, the arrangement incorporating a clutch means adapted to hold the movable element in brake setting position and which may be quickly and easily released without undue effort.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a view showing a forward portion of the vehicle illustrating the arrangement of my invention as incorporated therein;

Figure 2 is a side elevational view of an arrangement of mechanism control of my invention;

Figure 3 is a top plan view of the arrangement illustrated in Figure 1;

Figure 4 is a longitudinal sectional view taken substantially on the line 4—4 of Figure 3;

Figure 5 is a transverse sectional view taken substantially on the line 5—5 of Figure 4;

Figure 6 is an isometric view showing the clutching means forming a part of my invention;

Figure 7 is a transverse sectional view taken substantially on the line 7—7 of Figure 4;

Figure 8 is a transverse sectional view illustrating a modified form of clutch means of my invention.

While I have illustrated the mechanism control of my invention as arranged for manipulating the brakes of an automotive vehicle, it is to be understood that I contemplate the embodiment of my invention in conjunction with any mechanism where the same may be found to have utility.

Referring to the drawings and particularly Figure 1, there is illustrated the forward portion of a body compartment of a vehicle illustrating a cowl portion 10, wind shield 11, instrument panel 12, dash board 13, steering post 14, and steering wheel 15, the body being carried upon a chassis frame 16.

The brake control arrangement of my invention, referring more especially to Figures 2 through 7, is inclusive of a tubular shaped guide or supporting member 20 which, as illustrated, is formed of sheet metal, the adjacent edges of the tube being spaced as illustrated in Figure 3, the member being of substantially rectangular cross section. The forward extremity of member 20 is provided with an extension or bracket portion 22 adapted to be secured to a suitable portion of the vehicle as, for example, the dash board 13, while the rearward extremity of portion 20 is provided with laterally projecting ears 24 which may be secured to a bracket 23 which may be secured adjacent to the instrument panel as illustrated in Figure 1 or to another suitable portion of the vehicle.

Slidably positioned within the tubular portion 20 is an element 26 preferably formed of sheet metal and of U-shaped cross section, at its forward end the side walls 21 of the U-shape being juxtaposed as illustarted in Figure 3 and provided with aligned openings to receive a pin 27, the latter adapted to secure a brake rod clevis or bar 29 or other connecting means to the element 26. Bar 29 is connected to the end of the lever 17 fulcrumed upon a bracket 18 carried upon the frame 16, the other end of the lever being connected by means of a link 19 to a bell crank 25 which is associated with a second bell crank 29 connected to a brake operating rod 37 which is directly connected to the brakes of the vehicle.

In the form shown, the rear portion of element 26 projects beyond the extremity of member 20 and provides slightly spaced wall portions 28 to which is riveted or otherwise secured a handle portion or hand grip 30 by means of rivets 31. The hand grip member in the embodiment illustrated is formed of similarly shaped matched half sections 32 and 33 of sheet metal, the adjacent edges abutting as at 34 to thus form a hollow handle or grip member. The two half portions are further secured together by means of rivets 35 and 36.

The means for retaining the element 26 at any position within its travel or movement in guide portion 20 is inclusive of a member or bracket 38 having leg portions 39 formed with tenons 40 extending into spaced openings in the upper wall or bright portion of the movable member 26, the side wall portions 42 of the bracket extending upwardly and engaging the inner wall surface of member 26 to position the bracket 40 within member 26, the bracket being movable with the member. This bracket 40 is provided with an inclined clutching surface 43 angularly arranged with respect to the line of movement of the element 26, the angle of which is of such inclination as to provide a wedging angle with a clutch roller 44, that is, the inclination of the surface 43 with respect to the line of movement of member 26 should be less than 11°. Positioned beneath the clutch roller 44 is a plate or member 45 having a clutching surface 46 adapted for engagement with the roller 44, the side walls of member 28 being notched as at 48 to receive the plate or member 45 so that the plate normally moves with the member 26, but there is provided space or "lost motion" 49 so that the plate 45 may have limited independent movement to facilitate the action of the clutch roller in moving to clutching or element retaining or locking position.

A rivet or pin 50 extends through the handle 30 and forms a pivot upon which is journalled or pivoted a trigger or finger piece 52, the finger piece being of U-shaped cross section and is arranged to move in a slot 54 in the handle portion. The trigger 52 is urged to its outermost position by means of a hairpin spring 55, the spring being coiled around the pin 50 and having one leg portion 56 in contact with the inner wall of the finger piece 52 and the other leg portion 57 in engagement with rivet 35. The trigger 52 is provided with spaced wall portions 53 which extend upwardly into the interior of element 26 and are provided with aligned openings to receive a pin or rivet 58, the latter also passing through an opening in the extremity of a bar or member 59 which forms a means of actuating and releasing the clutch mechanism. The bar 59 is preferably of U-shaped cross section throughout a major portion of its length, the side walls of the U-shape being brought together adjacent its point of connection with the trigger member 52. The other extremity of the bar 59 is provided with struck up portions 60 and 61 and within the space formed by these walls is positioned the clutch roller 44. It is to be noted that the distance between the inner faces of the walls 60 and 61 is greater than the diameter of the clutch roller 44 so that the clutch roller is loosely contained in the space between walls 60 and 61. This lost motion is provided so that the clutch roller may have a limited amount of free movement so as to attain a free wedging position between clutching surfaces 43 and 46. As particularly illustrated in Figure 2, it is to be noted that the spring 55 urging the finger piece 52 in a counter-clockwise direction, through the connecting bar 59 and wall 61 thereof, urges the clutch roller 44 into wedging relation with clutch surfaces 43 and 46, thus whenever it is desired to bring the braking mechanism to brake setting position, the handle portion 30 may be grasped and the element or member 26 moved with respect to portion 20 thus moving the brake rod longitudinally of the guide portion 20 to brake setting position. When movement of member 26 with respect to member 20 ceases, the clutch roller 44 under the influence of the spring means is wedgingly positioned between the clutch surfaces 43 and 46 and prevents any return movement of member 26. It is to be noted that the clutching means is at all times in instant readiness to hold the element 26 in a fixed or brake setting position. When it is desired to release member 26, it is only necessary to retract the finger piece 52 toward the handle portion 30 about pivot pin 50, which moves the bar 59 longitudinally, bringing the wall 60 thereof into engagement with the clutch roler 44 to move the latter out of wedging engagement between clutching surfaces 43 and 46. This action frees the member 26 and may be returned to its normal position, viz., that illustrated in Figures 1 and 2.

In the form of the clutch means shown in Figure 8, there is provided a coil spring 70 which directly engages the roller 44' to at all times urge the roller toward wedging position between the bracket 38' and the plate 45'. The coil spring is carried upon a longitudinally extending arm 72 formed on a member 73 which has a reduced tenon portion 74 riveted into an opening in the upper axis of the movable element 26'. In this form of the invention the extremity of the bar 59' does not encircle the roller 44', but is provided with a single abutment or wall 60' which is adapted to engage the roller when it is desired to effect a release of the clutching means to retract the element 26'.

It is apparent that within the scope of the invention, modifications and different arrangements may be made other than is herein disclosed, and the present disclosure is illustrative merely, the invention comprehending all variations thereof.

What I claim is:

1. Mechanism control including a hollow supporting member; an element slidably mounted within said supporting member and adapted to be connected to the mechanism to be actuated; said element having a manipulating grip portion connected thereto; means including a clutch roller associated with said element for holding the latter in adjusted position with respect to the supporting member; manipulating means connected to and relatively movable with respect to said grip portion; and means connected to said manipulating means and terminating adjacent said clutch roller for releasing the latter.

2. Mechanism control including, in combination, a hollow sheet metal guide member; a sheet metal element slidably mounted within said guide member; said element having a manipulating grip portion; a clutch roller associated with said element for holding the latter in adjusted position with respect to the guide member; a finger piece pivotally supported upon the grip portion of said element; and means connected to the finger piece and terminating adjacent said clutch roller whereby movement of said finger piece actuates said means to effect a release of said clutch roller.

3. Mechanism control including an elongated tubular member; an element slidably mounted within said supporting member and adapted to be connected to the mechanism to be actuated; said element having a manipulating grip portion associated therewith; clutch means including an angularly arranged bracket positioned within said relatively movable element; a clutch roller cooperatively associated with said bracket for retaining the element in adjusted position; a member pivoted adjacent the grip portion of said element; and means connected with said pivoted member and adapted for engagement with said clutch roller for effecting a release of the clutching means.

4. Mechanism control including an elongated tubular supporting member; a sheet metal element of substantially U-shaped cross section slidably mounted within said supporting member and adapted to be connected to the mechanism to be actuated; said element having a manipulating grip portion connected thereto; clutching means including an angularly arranged bracket positioned within said movable element; a plate movable within said supporting member and arranged for limited relative movement with respect to said element; a clutch roller comparatively associated with said bracket and said plate for holding the element in adjusted position; a finger piece pivoted adjacent the grip portion; and means connected with said finger piece and adapted for engagement with said clutch roller for effecting a release of the latter.

5. Mechanism control including, in combination, a guide member; a sheet metal element of substantially U-shaped cross section slidably mounted upon said guide element; roller clutch means associated with said element for locking the same against movement with respect to the guide member; a hand grip member secured to said element, said hand grip comprising matched half sections formed of sheet metal; a finger piece pivotally connected to said hand grip member; and a bar connected to the finger piece and arranged to release said clutch means upon movement of said finger piece.

6. Mechanism control including a supporting member; an element carried by and slidably mounted upon said supporting member; a member having a surface angularly arranged with respect to the line of movement of said element; a plate carried by said supporting member and arranged for limited relative movement with respect to said element; a clutch roller positioned between said angularly arranged surface and said plate for retaining the element in adjusted position with respect to said supporting member; and means adapted for engagement with said clutch roller for effecting a release of the clutching means.

7. Mechanism control including a tubular supporting member; an element carried by and slidably mounted upon said supporting member; a member carried by said element and having a surface angularly arranged with respect to the line of movement of said element; a plate carried by said supporting member and arranged for limited relative movement with respect to said element; a clutch roller positioned between said angularly arranged surface and said plate for retaining the element in adjusted position with respect to said supporting member; spring means for normally urging said roller into engagement with the angularly arranged surface and said plate; and means adapted for engagement with said clutch roller for effecting a release of the clutching means.

8. Mechanism control including a tubular supporting member; an element carried by and slidably mounted upon said supporting member; a bracket carried by said element and having a clutch surface angularly arranged with respect to the line of movement of said element; a clutch roller adapted for engagement with the clutching surface of said bracket for retaining the element in adjusted position with respect to said supporting member; an arm carried by said element; spring means carried by said arm and directly engageable with said clutch roller for urging the latter toward clutching position; and means adapted for engagement with said clutch roller for effecting a release of the clutch roller.

9. Mechanism control including a relatively stationary supporting member; an element carried by and slidable with respect to said supporting member; said element having a manipulating handle; a roller clutch associated with said element for holding the same in adjusted position with respect to said support; a trigger pivotally supported adjacent said manipulating handle; and a bar connected to said trigger and terminating adjacent said roller clutch whereby pivotal movement of said trigger actuates said bar to release said roller clutch.

CHARLES S. McCARTHY.

CERTIFICATE OF CORRECTION.

Patent No. 2,205,987.                                          June 25, 1940.

CHARLES S. McCARTHY.

It is hereby certified that error appears in the printed specification of the above numbered patent requiring correction as follows: Page 2, first column, line 32, for "member 28" read --member 26--; and second column, line 23, for "roler" read --roller--; page 3, first column, line 6, claim 3, for the word "clutch" read --clutching--; and that the said Letters Patent should be read with this correction therein that the same may conform to the record of the case in the Patent Office.

Signed and sealed this 29th day of October, A. D. 1940.

(Seal)                                                   Henry Van Arsdale,
Acting Commissioner of Patents.